(12) United States Patent
Eberhard

(10) Patent No.: US 8,228,166 B2
(45) Date of Patent: Jul. 24, 2012

(54) VEHICLE HAVING AN AUTOMATICALLY OPENING FLAP

(75) Inventor: Siegfried Eberhard, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1111 days.

(21) Appl. No.: 11/709,727

(22) Filed: Feb. 23, 2007

(65) Prior Publication Data

US 2007/0205863 A1    Sep. 6, 2007

Related U.S. Application Data

(63) Continuation of application No. PCT/EP2005/008925, filed on Aug. 17, 2005.

(30) Foreign Application Priority Data

Aug. 28, 2004  (DE) .................. 10 2004 041 709

(51) Int. Cl.
  *G05B 23/00* (2006.01)
(52) U.S. Cl. ..................... 340/5.72; 340/5.61
(58) Field of Classification Search ............. 340/5.72, 340/5.61, 426.28, 426.29, 435, 541, 522, 340/523, 5.62, 5.64, 12.22, 12.23, 12.24; 49/26, 27, 25, 28
  See application file for complete search history.

(56) References Cited

U.S. PATENT DOCUMENTS

| | | | |
|---|---|---|---|
| 3,789,384 A * | 1/1974 | Akers | 340/521 |
| 5,216,410 A * | 6/1993 | Pildner et al. | 340/509 |
| 5,929,769 A | 7/1999 | Garnault | |
| 6,034,617 A * | 3/2000 | Luebke et al. | 340/5.62 |
| 6,205,710 B1 | 3/2001 | Busse | |
| 6,542,071 B1 * | 4/2003 | Ohtsubo et al. | 340/426.28 |
| 6,676,186 B2 | 1/2004 | Greif | |
| 2001/0042989 A1 | 11/2001 | Greif | |
| 2003/0105559 A1 | 6/2003 | Avenel | |
| 2003/0216817 A1 * | 11/2003 | Pudney | 700/17 |
| 2004/0085189 A1 * | 5/2004 | Nagai et al. | 340/5.72 |
| 2007/0205863 A1 | 9/2007 | Eberhard | |

FOREIGN PATENT DOCUMENTS

| | | |
|---|---|---|
| DE | 195 33 804 A1 | 3/1996 |
| DE | 296 23 461 U1 | 9/1998 |
| DE | 198 13 025 A1 | 9/1999 |
| DE | 198 29 731 A1 | 1/2000 |
| DE | 199 59 990 A1 | 6/2000 |
| DE | 101 29 177 A1 | 1/2002 |

(Continued)

OTHER PUBLICATIONS

The Operating Manuel for the BMW 5-Series, 2002, Order Number No. 01 40 0 156 808, pp. 34-36.
International Search Report dated Dec. 15, 2005 with English translation (Six (6) Pages).

(Continued)

*Primary Examiner* — Nabil Syed
(74) *Attorney, Agent, or Firm* — Crowell & Moring LLP

(57) ABSTRACT

A vehicle, particularly a motor vehicle, has a flap, which automatically opens as a result of an opening command. The opening command takes place without a manual operation of an unlocking/locking mechanism. A proximity sensor and a control device coupled therewith are present, the control device being constructed such that it recognizes the presence of a valid access authorization device within a surrounding area and, if a valid access authorization device is recognized, as a function of the presence of an unlocking signal of the proximity sensor, activates the unlocking/locking mechanism for releasing the automatically opening flap.

19 Claims, 2 Drawing Sheets

FOREIGN PATENT DOCUMENTS

| | | |
|---|---|---|
| DE | 101 06 400 B4 | 7/2004 |
| DE | 696 35 387 T2 | 5/2006 |
| DE | 600 30 935 T2 | 1/2007 |
| DE | 601 19 208 T2 | 2/2007 |
| EP | 1 099 812 A2 | 5/2001 |
| EP | 1 143 092 A1 | 10/2001 |
| EP | 1 207 262 B1 | 5/2002 |
| EP | 1 789 645 B1 | 5/2007 |
| WO | WO 03/097971 A1 | 11/2003 |

OTHER PUBLICATIONS

German-language Opposition dated Sep. 7, 2009 (Sixteen (16) pages).

German-language Opposition dated Sep. 4, 2009 (Eighteen (18) pages).

German Letter dated Nov. 17, 2011 to the European Patent Office (ten (10) pages).

* cited by examiner

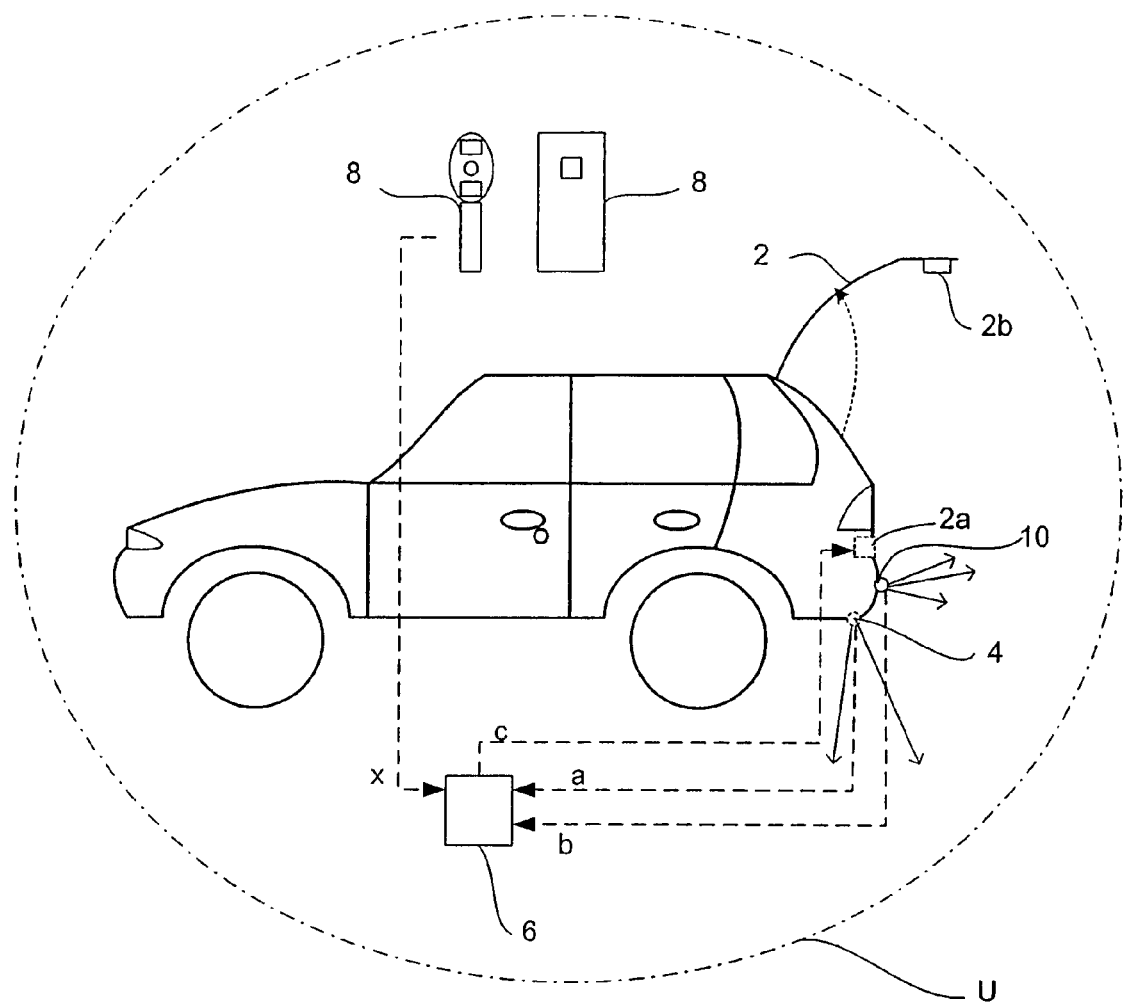
Figure 1
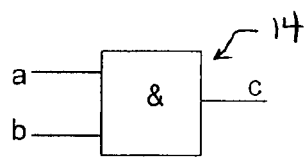
Figure 3
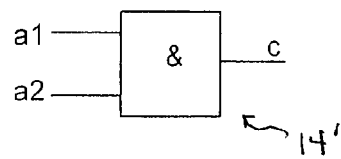

VEHICLE HAVING AN AUTOMATICALLY OPENING FLAP

CROSS-REFERENCE TO RELATED APPLICATIONS

This application is a continuation of PCT International Application No. PCT/EP2005/008925, filed on Aug. 17, 2005, which claims priority under 35 U.S.C. §119 to German Application No. 10 2004 041 709.1, filed Aug. 28, 2004, the entire disclosures of which are expressly incorporated by reference herein.

BACKGROUND AND SUMMARY OF THE INVENTION

The invention relates to a vehicle, particularly to a motor vehicle, having a flap that opens automatically based on an opening command which is issued without manually actuating an unlocking/locking mechanism.

A vehicle of the above-mentioned type is known from the assignee's vehicle program. The Operating Manual for the BMW 5-Series, Year 2002, Order Number No. 01 40 0 156 808, Pages 34-36, describes a motor vehicle having an automatically opening flap and an opening mechanism which can be activated by remote control. Here, the operator can initiate an opening command for the rear flap by remote control, which rear flap will then completely open automatically.

Furthermore, a vehicle is known from German Patent document DE 195 33 804 A1, in the case of which, at a swivelable vehicle door, the distance is detected to objects situated in the swiveling range of the door by use of an additional sensor. In the event an object is detected within the predetermined distance, a locking device is activated for blocking a further door opening movement.

There is, however, still needed a further developed vehicle of the above-mentioned type such that opening of vehicle flaps accessible from the outside of the vehicle (vehicle exterior) is simplified.

According to the invention, this, and other, needs are met by a vehicle, particularly a motor vehicle, having a flap which automatically opens as a result of an opening command. The opening command takes place without a manual operation of an unlocking/locking mechanism, wherein a proximity sensor and a control device are provided. The control device is operatively connected on one side with an unlocking/locking mechanism for the automatically opening flap and on the other side with the proximity sensor. The control device is constructed such that it recognizes the presence of a valid access authorization device within a surrounding area and, if a valid access authorization device is recognized, as a function of the presence of an unlocking signal of the proximity sensor, activates the unlocking/locking mechanism for releasing the automatically opening flap.

As a result of the arrangement of an additional proximity sensor, that can be used as a switch by the user in a targeted manner (in that the user carries out a movement in the detection range of the proximity sensor or intentionally approaches this proximity sensor in a targeted manner with at least one body part or an object), and of an especially constructed control device operatively connected with the proximity sensor, the comfort of a vehicle user with respect to the opening of vehicle flaps accessible from the outside can clearly be increased.

According to the invention, the control device is constructed for this purpose such that it detects the presence of a valid access authorization device (for example, an intelligent vehicle key or keycard). If an access authorization recognition signal initiated on the basis of the detected valid access authorization device is present and an unlocking signal (distance recognition signal) of the proximity sensor is also present, the control device activates the opening mechanism for releasing the automatically opening door flap. By way of the device according to the invention, a vehicle user carrying his vehicle key and having both hands engaged because of an object to be carried, as a result of the activating of the additionally present proximity sensor, can initiate the opening operation of an automatically opening flap (e.g., vehicle door, trunk lid, rear door flap, filler inlet cap or engine hood).

Advantageously, the at least one proximity sensor is arranged below the automatically opening flap in the operating direction toward the road such that a user can cause the proximity sensor, in a targeted manner, to carry out a switching operation or to generate an unlocking signal in that he, for example, moves his foot in the operating range of the proximity sensor between the road surface and the proximity sensor. In a particularly preferred embodiment of the invention, the proximity sensor is arranged in the lower area of the rear apron (or of the bumper). As a result, particularly the automatic opening of the rear flap or of the trunk lid is initiated.

A further aspect provides additional operational protection of the arrangement according to the invention. The additional protection takes place, for example, by the integration of an existing distance detection system for the rear area of a motor vehicle. Such distance detection systems, also called PDC systems (park distance control systems), as a rule, operate with ultra sound or radar radiation and, according to the known state of the art, are activated only when the ignition is switched on and the reverse gear is engaged simultaneously. Within the scope of the invention, the control device is constructed such that an existing distance detection system is already activated when the ignition is switched off, particularly as soon as the control device has detected a valid access authorization device. The protection then takes place in that the, or each, proximity sensor is switched to be active only with the activation of the distance detection system, and in particular only when a response of the distance detection system is recognized to be below a minimum distance. As a result, this avoids the possibility that animals running under the vehicle may trigger the opening of a flap when the user has already moved farther away from the vehicle.

An alternative or additional protection of the operation can also take place in that at least two mutually spaced proximity sensors are used. In this case, the control device is preferably constructed such that an opening of the automatically openings flap only takes place when both proximity sensors are switched or actuated within a defined time window and preferably in a predetermined sequence.

Another important further development and protection measure consists of the act that the opening mechanism is activated or triggered by the control device only when the vehicle is stationary and/or when the ignition of the vehicle is switched off.

Other objects, advantages and novel features of the present invention will become apparent from the following detailed description of the invention when considered in conjunction with the accompanying drawings.

BRIEF DESCRIPTION OF THE DRAWINGS

FIG. 1 is a lateral schematic view of an embodiment of a vehicle according to the invention;

FIG. 3 is a view of two possible embodiments of an operational logic for the operational protection in two contemplated embodiments.

DETAILED DESCRIPTION OF THE DRAWINGS

Figure 2:
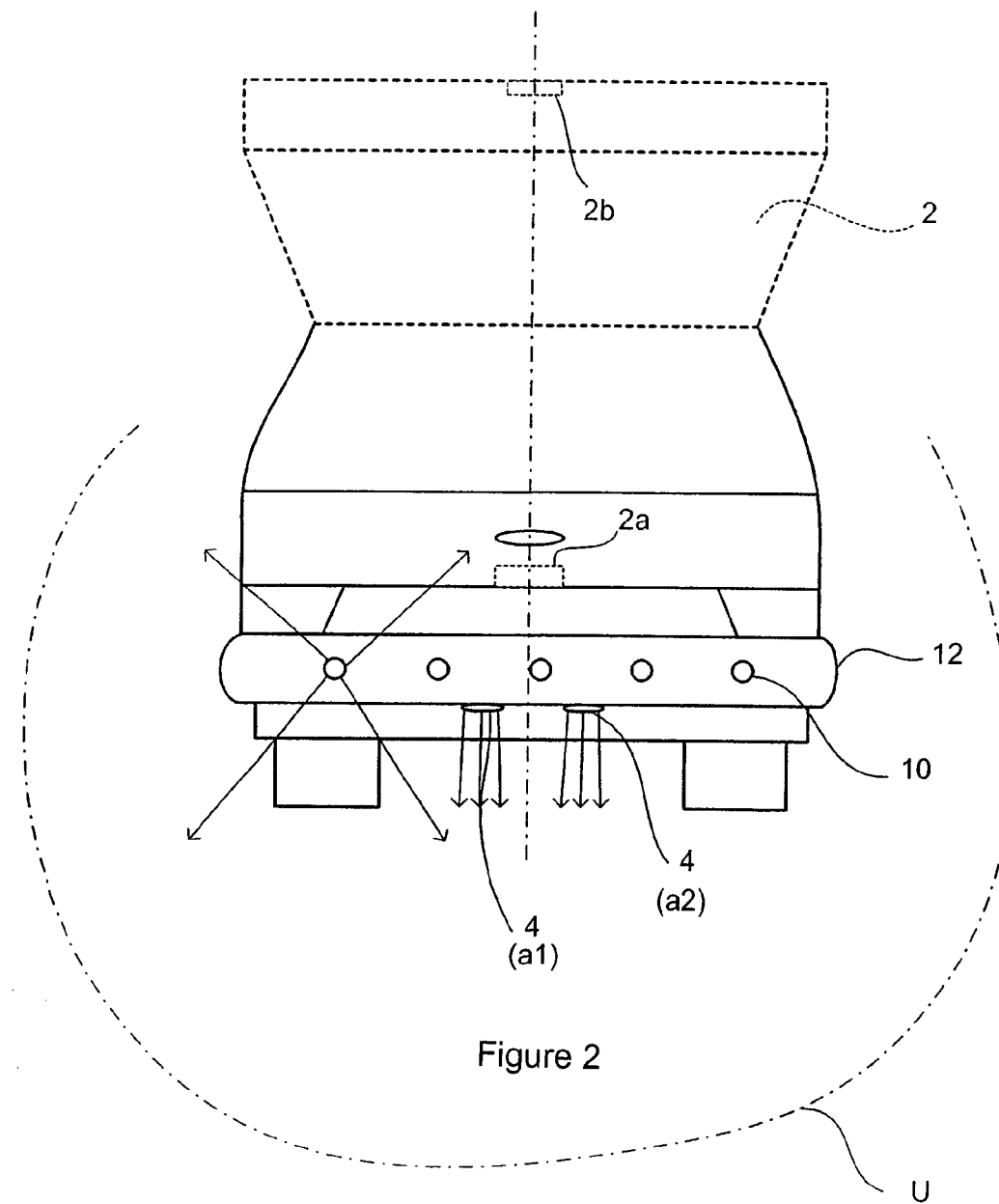
FIG. 2 is a rear schematic view of the vehicle according to FIG. 1.

FIG. 1 is a schematic representation of a preferred embodiment of the vehicle according to the invention. The motor vehicle includes a flap 2 opening automatically upon an opening command. In the illustrated embodiment, the flap 2 is constructed as a rear door of a motor vehicle. The automatic opening of the flap 2 is initiated by an opening command by the user, on the basis of which a locking and unlocking mechanism 2a, 2b respectively is caused to release the flap 2 which is then, either as a result of an initial spring tension or as a result of an activated (for example, electric, hydraulic or pneumatic) motor device, raised into an opened position. In this case, the flap 2 is advantageously automatically opened along its entire opening path (or up to a maximally permitted opening path). The maximally permitted opening path may be defined by way of a device according to German Patent document DE 100 56 569 A1 or German Patent document DE 195 33 804 A1.

Furthermore, the motor vehicle of FIG. 1 includes at least one, but preferably two, proximity sensor(s) 4. According to the invention, each proximity sensor 4, as well as also the unlocking mechanism 2a, 2b, are operatively coupled with a control device 6. In this case, the control device 6 is constructed such that, on the one hand, it monitors the presence of an access authorization device 8. While integrating the control device 6, it is checked for this purpose whether an access authorization device (as a rule, a user carrying a key or a keycard) is present within a defined area U around the vehicle. If a valid access authorization device 8 is recognized (presence of an access authorization recognition signal x), and an unlocking signal a is then additionally generated by the proximity sensor 4, the control device 6 will cause the unlocking mechanism 2a, 2b, by way of a control signal c, to release or to open the automatically opening flap 2 or to initiate the opening operation. Advantageously, the, or each, proximity sensor 4 will only be switched on when the control device 6 detects an access authorization device 8 in the surrounding area U.

The at least one proximity sensor 4 is preferably arranged such that a user can cause it to switch, or can switch it, by swinging his foot in the area between the vehicle body and the road surface. In particular, the proximity sensor 4 is arranged below a bumper 12 or on the bottom side of a bumper 12 while being integrated in the latter (see FIG. 2 in particular).

Furthermore, a rearward (rear-side) distance detection system 10 (PDC) is preferably provided which, when the ignition is off, will already be switched on when the control device 6 recognizes an access authorization device 8 in the surrounding area U. Also in this combination, the, or each, proximity sensor 4 will advantageously not be activated before this point in time for the purpose of an unlocking. In an embodiment with a distance detection system 10, each proximity switch 4, as an alternative, may also only be activated or switched on when the existing distance detection system 10 responds and supplies a pdc signal b as a result of a detected object.

In order to avoid the flap 2 from opening automatically when the vehicle is driving, the control device 6 is constructed such that an initiation of the opening operation or a generating of the control signal c initiating the opening operation can only take place when the vehicle is stationary, particularly when the vehicle is stationary and the ignition is switched off. This means that the unlocking signal a generated by way of the proximity sensor 4 is switched through only as a function of a predefined condition (example of the condition: a stationary vehicle) and can initiate an automatic opening operation of the flap 2.

FIG. 2 is a rear view of the vehicle illustrated in FIG. 1, in which an exemplary location and operational direction of the proximity sensors 4 are shown more clearly.

FIG. 3 shows two possible embodiments for the operational logic 14 by which it is ensured that an opening of the flap 2 does not take place accidentally or does not take place in any fashion other than intentionally by the legitimate user. In the top logic 14, the unlocking signal a generated by the user by way of the at least one proximity sensor, and the pdc signal b which is generated as a result of the user's approaching the vehicle, are guided for this purpose onto a common AND element. The control signal c for initiating the opening of the flap 2 or for unlocking the unlocking and locking mechanism 2a, 2b is, therefore, generated only when both above-mentioned prerequisites exist.

As an alternative, in the bottom logic 14', at least two unlocking signals a1, a2 are fed to the AND logic, so that generating of the control signal c will take place only if the two proximity sensors 4 were operated. Other embodiments are also possible, such as one in which the signals a1 . . . and on of all proximity sensors 4 are fed, together with the pdc signal b, to an AND element and, as a function of these conditions, a control signal c is generated (not shown)(or the unlocking signal a is switched through). Advantageously, the proximity sensors 4 also have to be operated in a defined sequence and within a defined time window, so that a control signal c may be generated. For example, for this purpose, at least one proximity sensor 4 may be guided onto a time function logic element (for example, a flipflop).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
a flap operatively configured to automatically open as a result of an opening command, the opening command being generated without a manual operation of an unlocking/locking mechanism;
a first proximity sensor arranged on the vehicle;
a second proximity sensor arranged on the vehicle;
a distance detection system arranged on the vehicle, the distance detection system being operational for an area situated behind the vehicle; and
a control device operatively coupled to the unlocking/locking mechanism and the first and second proximity sensors, the control device being configured to recognize a presence of a valid access authorization device for the vehicle within a defined area surrounding the vehicle;
wherein the distance detection system is arranged separately from the control device;
wherein the distance detection system is switched on only if the valid access authorization device is recognized by the control device;
wherein the first proximity sensor is switched on only with a response from the distance detection system;
wherein the control device is further operatively configured to activate the unlocking/locking mechanism only if the first and second proximity sensors are actuated within a defined time window; and wherein, if the valid access authorization device is recognized, a detection signal of the first proximity sensor is present, and a detection signal of the second proximity sensor is present, the control device is operatively configured to activate the unlocking/locking mechanism for releasing the automatically opening flap.

2. The vehicle according to claim 1, wherein the second proximity sensor is switched on only with a response from the distance detection system.

3. The vehicle according to claim 1, wherein the control device is operatively configured such that the unlocking/locking mechanism is only activated when the vehicle is stationary or when the vehicle is stationary and the ignition is switched-off.

4. The vehicle according to claim 1, wherein the first proximity sensor is operatively arranged on the vehicle with an operational direction for detecting objects being directed downward in a direction of a surface on which the vehicle is located.

5. The vehicle according to claim 1, wherein the first and second proximity sensors are operatively arranged on the vehicle with operational directions for detecting objects being directed downward in a direction of a surface on which the vehicle is located.

6. The vehicle according to claim 1, wherein the first proximity sensor is arranged below a rear bumper of the vehicle or arranged on a bottom side of the rear bumper while being integrated in the bumper, an operating direction of the first proximity sensor being directed toward a surface on which the vehicle is located.

7. The vehicle according to claim 1, wherein the first and second proximity sensors are arranged below a rear bumper of the vehicle or arranged on a bottom side of the rear bumper while being integrated in the bumper, operating directions of the first and second proximity sensors being directed toward a surface on which the vehicle is located.

8. The vehicle according to claim 1, wherein the automatically opening flap is at least one of a trunk lid, a rear door, a side door, a hood, and a fuel filler flap.

9. A system for a motor vehicle having a flap that automatically opens based on an opening command, the system comprising:
an access authorization device;
a first proximity sensor;
a second proximity sensor;
a distance detection system; and
a control device, the control device being operatively configured to recognize that the access authorization device is within a defined area;
wherein the distance detection system is arranged separately from the control device;
wherein the distance detection system is switched on only if the access authorization device is recognized by the control device;
wherein the first proximity sensor is switched on only with a response from the distance detection system;
wherein the control device is further operatively configured to activate the unlocking/locking mechanism only if the first and second proximity sensors are actuated within a defined time window; and
wherein the control device is further operatively configured to activate the automatically opening flap of the vehicle when the access authorization device is recognized, a detection signal of the first proximity sensor is present, and a detection signal of the second proximity sensor is present.

10. A method for controlling a flap of a vehicle, the flap being automatically openable as a result of an opening command, the method comprising the acts of:
recognizing, by a control device, a presence of a valid access authorization device within a defined area surrounding the vehicle;
switching on a distance detection system arranged on the vehicle when the valid access authorization device is recognized by the control device;
detecting a response of the distance detection system;
switching on a first proximity sensor arranged on the vehicle when the response from the distance detection system is detected;
detecting a detection signal of the first proximity sensor;
detecting a detection signal of a second proximity sensor arranged on the vehicle; and
activating the automatically opening flap when the valid access authorization device is recognized, the detection signal of the first proximity sensor is present, and the detection signal of the second proximity sensor is present;
wherein the distance detection system is arranged separately from the control device; and
wherein the automatically opening flap is activated only if the first and second proximity sensors are actuated within a defined time window.

11. The method according to claim 10, wherein the act of activating the automatically opening flap only occurs when the vehicle is stationary or when the vehicle is stationary and the ignition of the vehicle is switched-off.

12. The vehicle according to claim 1, wherein the control device is further operatively configured to activate the unlocking/locking mechanism only if the first and second proximity sensors are actuated in a predetermined sequence.

13. The system according to claim 9, wherein the control device is further operatively configured to activate the unlocking/locking mechanism only if the first and second proximity sensors are actuated in a predetermined sequence.

14. The method according to claim 10, wherein the automatically opening flap is activated only if the first and second proximity sensors are actuated in a predetermined sequence.

15. The vehicle according to claim 1, wherein if the valid access authorization device is recognized, the response from the distance detection system is present, the detection signal of the first proximity sensor is present, and the detection signal of the second proximity sensor is present, the control device is operatively configured to activate the unlocking/locking mechanism for releasing the automatically opening flap.

16. The system according to claim 9, wherein the second proximity sensor is switched on only with a response from the distance detection system.

17. The method according to claim 10, wherein the second proximity sensor is switched on only with a response from the distance detection system.

18. The vehicle according to claim 1, wherein the distance detection system operates by using ultrasound or radar.

19. The vehicle according to claim 1, wherein the distance detection system generates the response only if a distance of a user from the distance detection system is less than a minimum distance.

* * * * *